United States Patent [19]

Vu et al.

[11] Patent Number: 5,750,277
[45] Date of Patent: May 12, 1998

[54] CURRENT INTERRUPTER FOR ELECTROCHEMICAL CELLS

[75] Inventors: Viet H. Vu, Milford, Mass.; Lucien P. Fontaine, Lincoln, R.I.; William T. McHugh, Westwood, Mass.; Robert J. Pinault, West Warwick, R.I.; Jane A. Blasi, Acton, Mass.; Steven K. Sullivan, Cranston, R.I.; Geoffrey J. Paquin, North Attleboro, Mass.; Stephen S. Johnson, Attleboro, Mass.; Gary K. Maus, South Attleboro, Mass.; Lance E. Cambra, Acushnet, Mass.

[73] Assignees: Texas Instruments Incorporated, Dallas, Tex.; Duracell Inc., Bethel, Conn.

[21] Appl. No.: 720,585

[22] Filed: Oct. 2, 1996

Related U.S. Application Data

[60] Provisional application No. 60/015,153, Apr. 10, 1996.
[51] Int. Cl.⁶ .................... H01M 2/12; H01M 10/50
[52] U.S. Cl. .................... 429/7; 429/61; 429/62
[58] Field of Search .................... 429/7, 53, 56, 429/57, 58, 61, 62

[56] References Cited

U.S. PATENT DOCUMENTS

| | | |
|---|---|---|
| 3,373,057 | 3/1968 | Jost . |
| 3,617,386 | 11/1971 | Bosben . |
| 3,996,547 | 12/1976 | Kinjo . |
| 4,035,552 | 7/1977 | Epstein .................... 429/58 |
| 4,188,460 | 2/1980 | Kang . |
| 4,943,497 | 7/1990 | Oishi . |
| 5,080,985 | 1/1992 | Wiacek . |
| 5,188,909 | 2/1993 | Pedicini .................... 429/7 |
| 5,521,021 | 5/1996 | Alexandres et al. .................... 429/54 |

Primary Examiner—Anthony Skapars
Attorney, Agent, or Firm—Russell E. Baumann; Richard L. Donaldson; Rene' E. Grossman

[57] ABSTRACT

A current interrupt mechanism for electrochemical cells is disclosed. A thermally activated current interrupt mechanism is integrated into an end cap assembly for an electrochemical cell. The thermally responsive mechanism preferably includes a free floating bimetallic disk which deforms when exposed to elevated temperature causing a break in an electrical pathway within the end cap assembly. This prevents current from flowing through the cell and effectively shuts down an operating cell. Alternatively, the thermally responsive mechanism may include a meltable mass of material which melts when exposed to elevated temperature to break an electrical pathway within the end cap assembly. The end cap assembly may also include integrated therein a pressure responsive current interrupt mechanism. If the internal gas pressure within an operating cell exceeds a predetermined value, the pressure responsive mechanism activates to sever an electrical pathway within the end cap assembly to prevent current from passing through the cell. The pressure responsive mechanism may include a diaphragm which ruptures when there is extreme gas pressure buildup. Gas is allowed to escape from the cell interior to the external environment through a series of vent apertures within the end cap assembly.

51 Claims, 6 Drawing Sheets

CURRENT INTERRUPTER FOR ELECTROCHEMICAL CELLS

This application claims benefit of Provisional application Ser. No. 60/015,153 filed Apr. 10, 1996.

FIELD OF THE INVENTION

This invention relates to a thermally responsive current interrupter for an electrochemical cell, which safely prevents current flow through the cell upon an excessive increase in the temperature thereof. The invention also relates to a pressure responsive current interrupter for a cell, which safely shuts down the cell upon excessive gas pressure buildup therein.

BACKGROUND OF THE INVENTION

Electrochemical cells, especially high energy density cells such as those in which lithium is an active material, are subject to leakage or rupture which, in turn, can cause damage to the device which is powered by the cell or to the surrounding environment. In the case of rechargeable cells, the rise in internal temperature of the cell can result from overcharging. Undesirable temperature increases are often accompanied by a corresponding increase in internal gas pressure. This is likely to occur in the event of an external short circuit condition. It is desirable that safety devices accompany the cell without unduly increasing the cost, size or mass of the cell.

Such cells, particularly rechargeable cells utilizing lithium as an active material, are subject to leakage or rupture caused by a rise in internal temperature of the cell which often is accompanied by a corresponding increase in pressure. This is likely to be-caused by abusive conditions, such as overcharging or by a short circuit condition. It is also important that these cells be hermetically sealed to prevent the egress of electrolyte solvent and the ingress of moisture from the exterior environment.

As set forth above, as such a cell is charged, self-heating occurs. Charging at too rapid a rate or overcharging can lead to an increase in the temperature. When the temperature exceeds a certain point, which varies depending upon the chemistry and structure of the cell, an undesirable and uncontrollable thermal runaway condition begins. In addition, because of the overheating, internal pressure builds up, and electrolyte may suddenly be expelled from the cell. It is preferable to initiate controlled venting before that takes place.

Conventional cell designs employ an end cap fitting which is inserted into an open ended cylindrical casing after the cell anode and cathode active material and appropriate separator material and electrolyte have been inserted into the cylindrical case. The end cap is in electrical contact with one of the anode or cathode material and the exposed portion of the end cap forms one of the cell terminals. A portion of the cell casing forms the other terminal. The prior art discloses means responsive to over pressure conditions which have been integrated into the cell end cap fitting.

SUMMARY OF THE INVENTION

The present invention has one or several current interrupt mechanisms integrated within a single end cap assembly which may be applied advantageously to primary or secondary (rechargeable) cells, for example, by inserting the end cap assembly into the open end of a casing for the cell. The end cap assembly of the invention has particular application to rechargeable cells, for example lithium-ion, nickel metal hydride, nickel cadmium or other rechargeable cells, to overcome the danger of the cell overheating and pressure building up in the cell during exposure to high temperatures, excessive or improper charging, or shorting of the cell.

In one aspect the invention is directed to an end cap assembly for an electrochemical cell wherein the end cap assembly has integrated therein a thermally responsive current interrupt mechanism which activates to interrupt and prevent current from flowing through the cell when the cell interior overheats to exceed a predetermined temperature. The end cap assembly has an exposed end cap plate which functions as a terminal of the cell. When the assembly is applied to a cell and the cell is in normal operation the end cap plate is in electrical communication with a cell electrode (anode or cathode). The thermally activated current interrupt mechanism integrated within the end cap assembly may comprise a bimetallic member that deflects when exposed to temperature above a predetermined value. The deflection of the bimetallic member pushes against a movable metal member to sever electrical connection between an electrode of the cell and the end cap terminal plate thus preventing current from flowing through the cell. Alternatively, in another aspect of the invention a thermally responsive pellet may be used instead of the bimetallic member. If the temperature of the cell exceeds a predetermined value, the thermal pellet melts causing a metallic member supported thereon to deflect sufficiently to sever the electrical pathway between an electrode of the cell and the end cap terminal plate. A rupturable plate or membrane may be integrated into the end cap assembly along with the thermally responsive current interrupt mechanism. When pressure within the cell builds up to exceed a predetermined value the plate or membrane ruptures allowing gas from the interior of the cell to escape to the external environment.

In another aspect the invention is directed to an end cap assembly for cells, particularly rechargeable cells, wherein the end cap has integrated therein two current interrupt mechanisms one being thermally responsive and the other being pressure responsive. The thermally responsive current interrupt mechanism may preferably employ a bimetallic member or thermally responsive meltable pellet which activates to interrupt and prevent current flow through the cell when the cell interior overheats to exceed a predetermined temperature. The pressure responsive current interrupt mechanism activates to interrupt current flow when gas pressure in the cell builds up to exceed a predetermined value. In such case, the pressure interrupt mechanism may cause a metal diaphragm within the end cap assembly to deflect thereby severing the electrical connection between the cell end cap terminal plate and a cell electrode, thereby preventing current from flowing through the cell. In the case of extreme gas pressure buildup the metal diaphragm also ruptures allowing gas to be channeled into interior chambers within the end cap assembly and out to the external environment through a series of vent holes.

Another aspect of the invention is directed to a sealing mechanism for the end cap assembly of the invention. The sealing mechanism prevents leakage of electrolyte, liquid or gas from the end cap interior to the external environment and prevents ingress of moisture into the cell.

BRIEF DESCRIPTION OF THE DRAWINGS

The features of the invention will be better appreciated with reference to the drawings in which.

3

Figure 1:
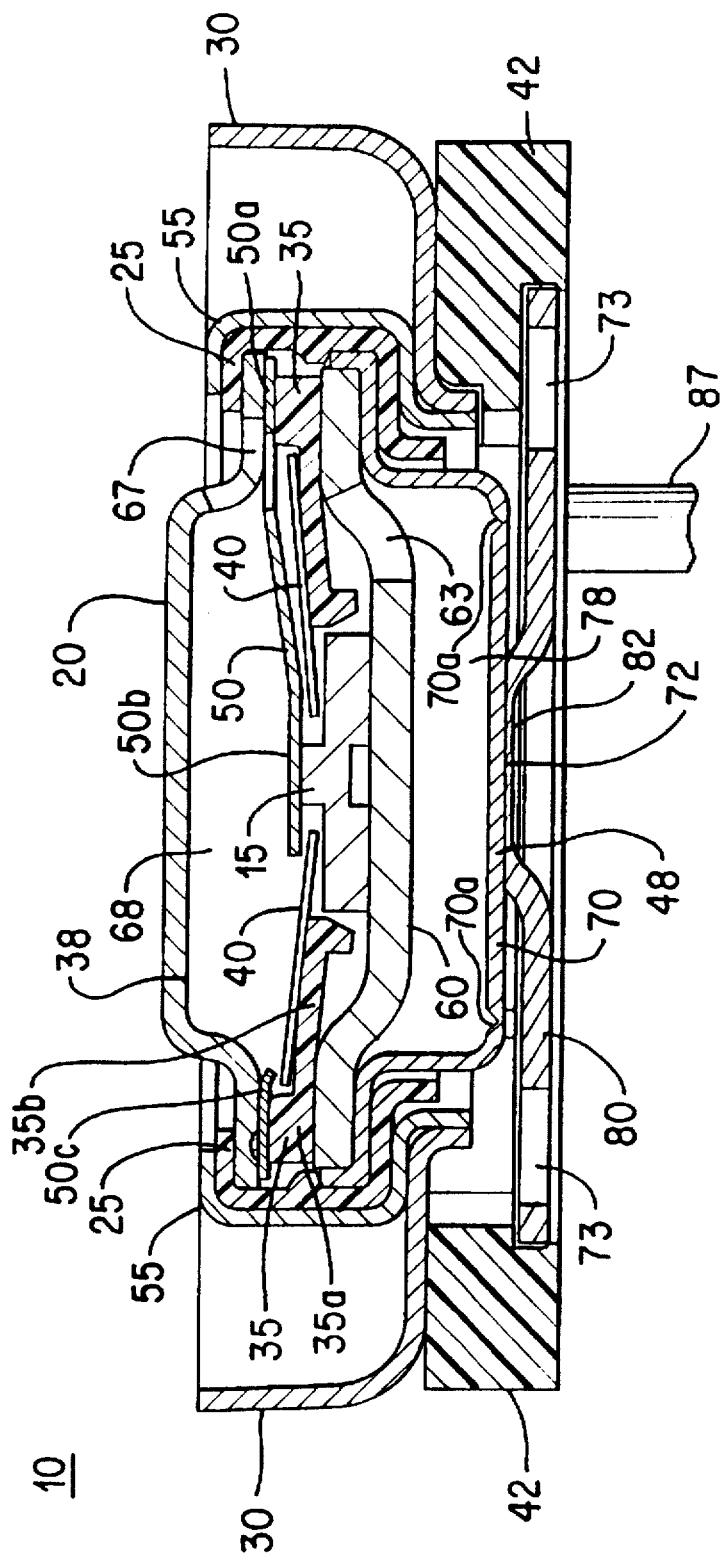
FIGS. 1, 2 and 3 are vertical cross-sectional views taken through sight lines 1—1 of the end cap assembly of FIG. 6.

FIG. 1 shows the thermally activated current interrupt mechanism and pressure activated current interrupt mechanism in circuit connected mode.

Figure 2:
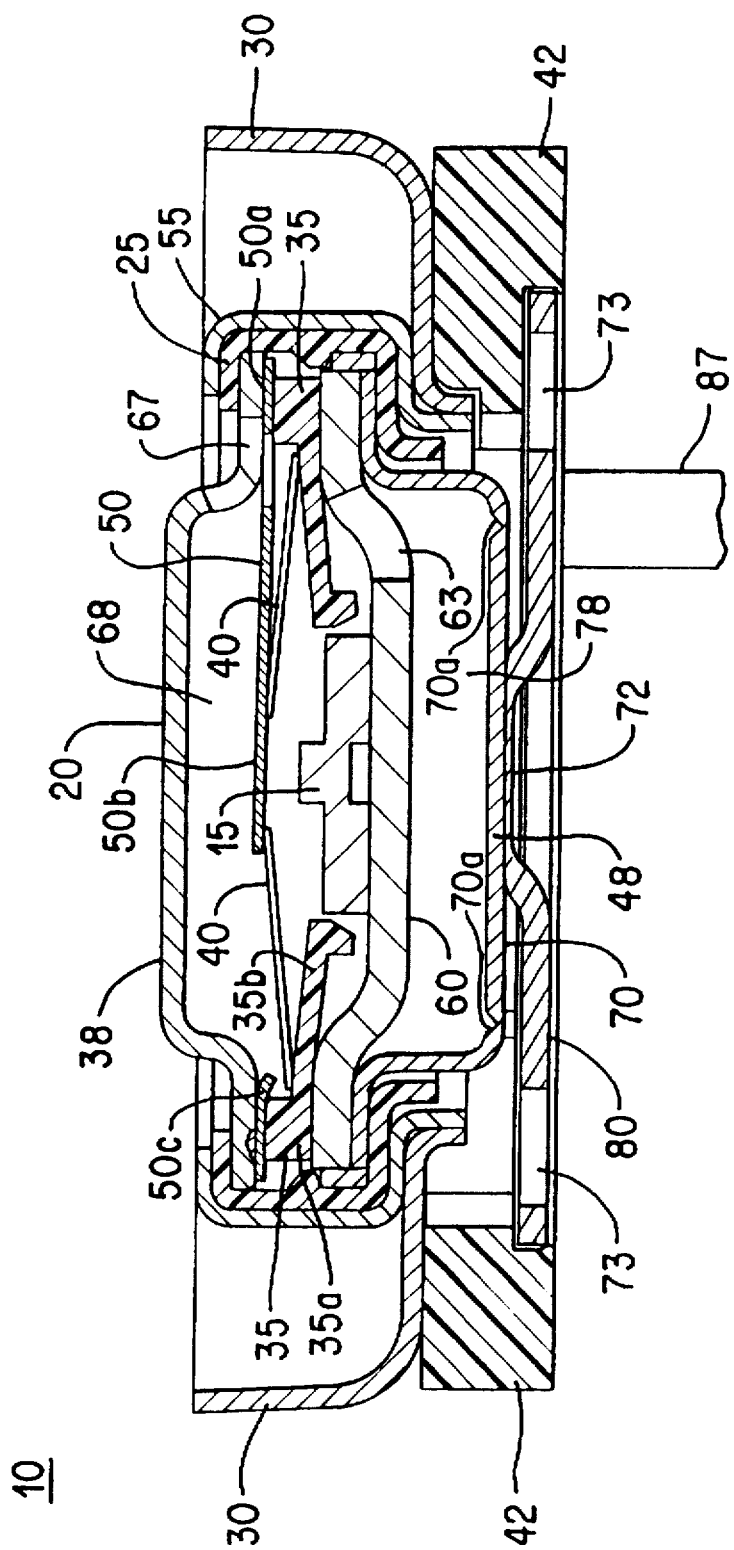

FIG. 2 shows the thermally activated current interrupt mechanism in circuit interrupted mode.

Figure 3:
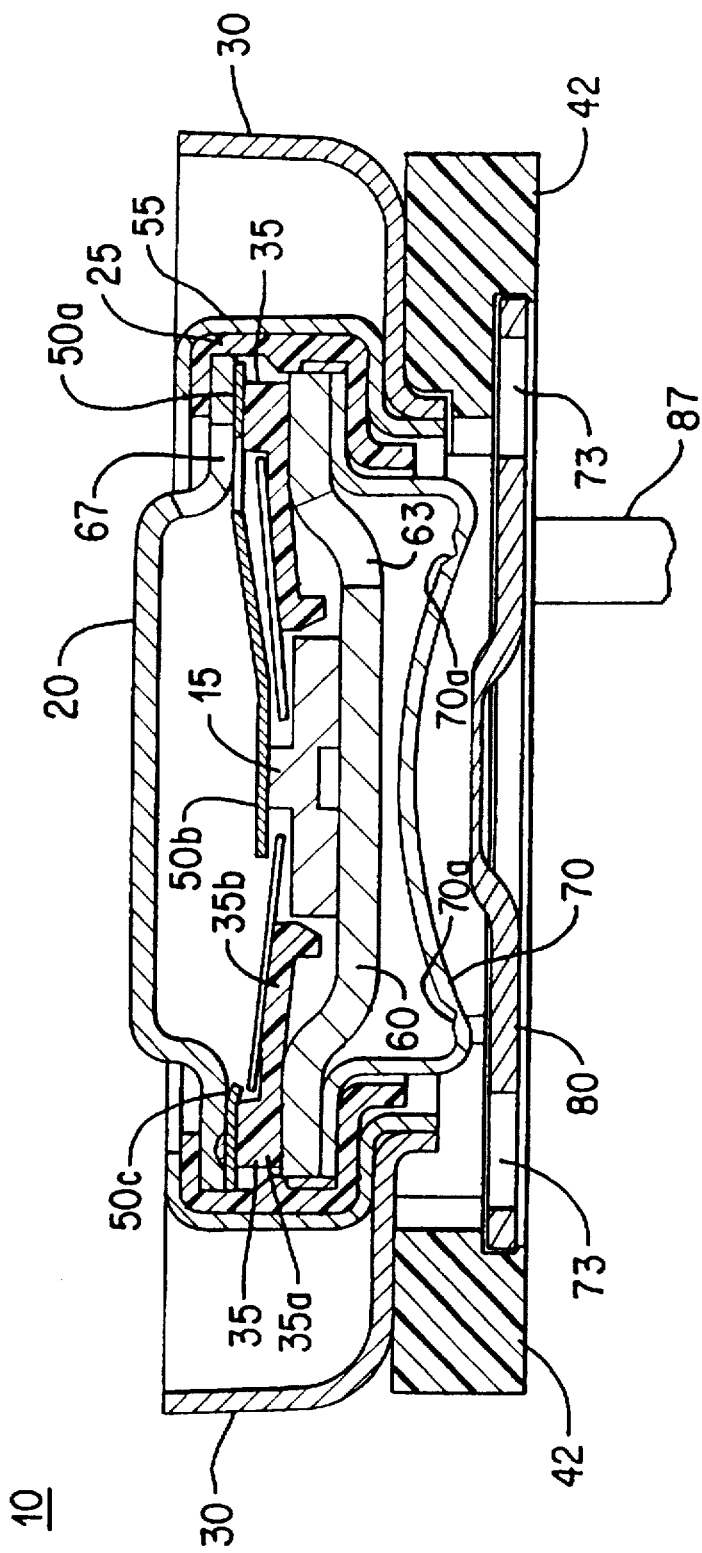

FIG. 3 shows the pressure activated current interrupt mechanism in pressure activated, circuit interrupted mode.

Figure 4:
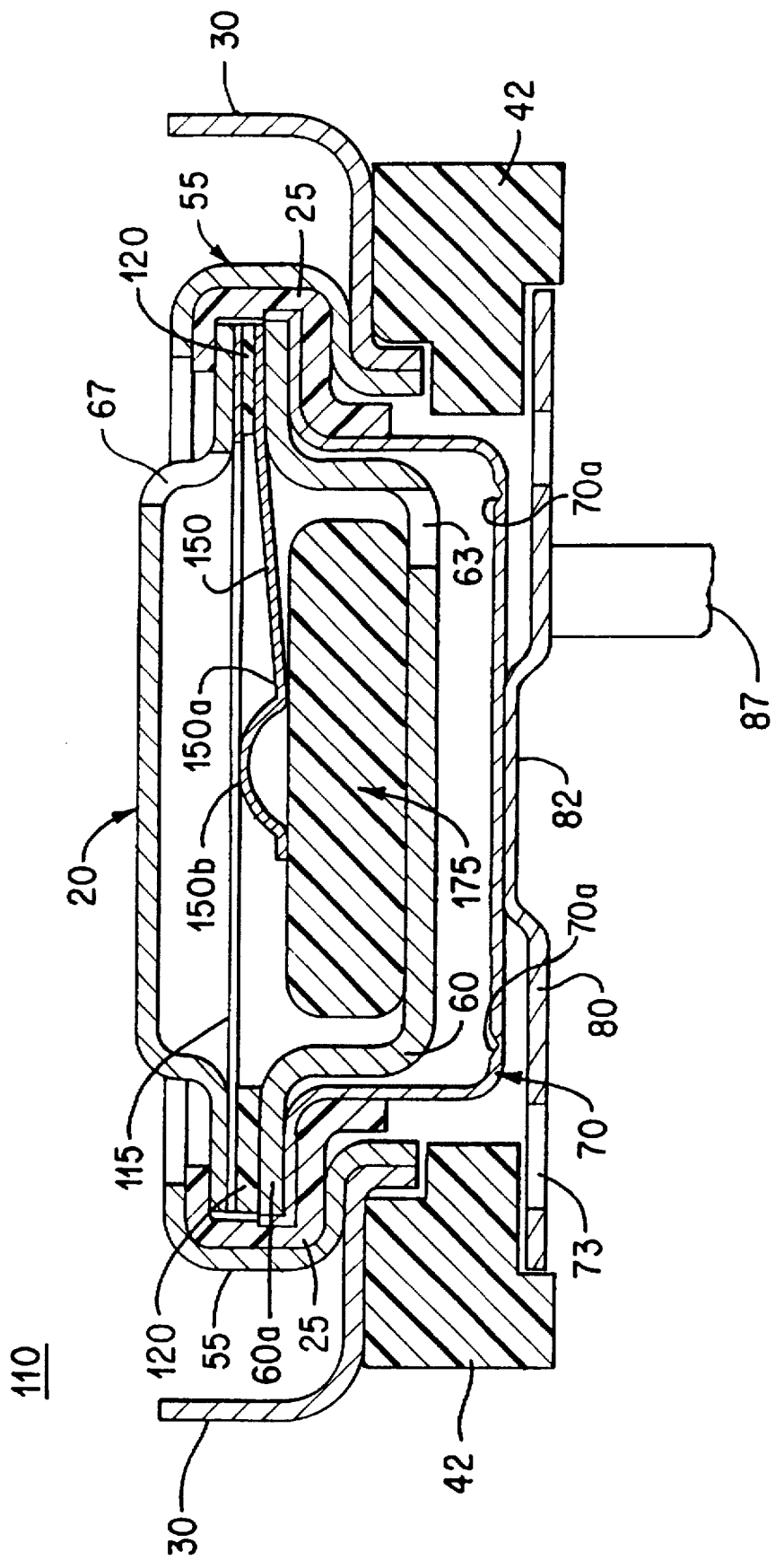

FIG. 4 is a vertical cross-sectional view of another embodiment of an end cap assembly having pressure activated current interrupt mechanism and thermally activated current interrupt mechanism integrated therein in which a heat sensitive member softens to release a resilient member to open the circuit.

Figure 5:
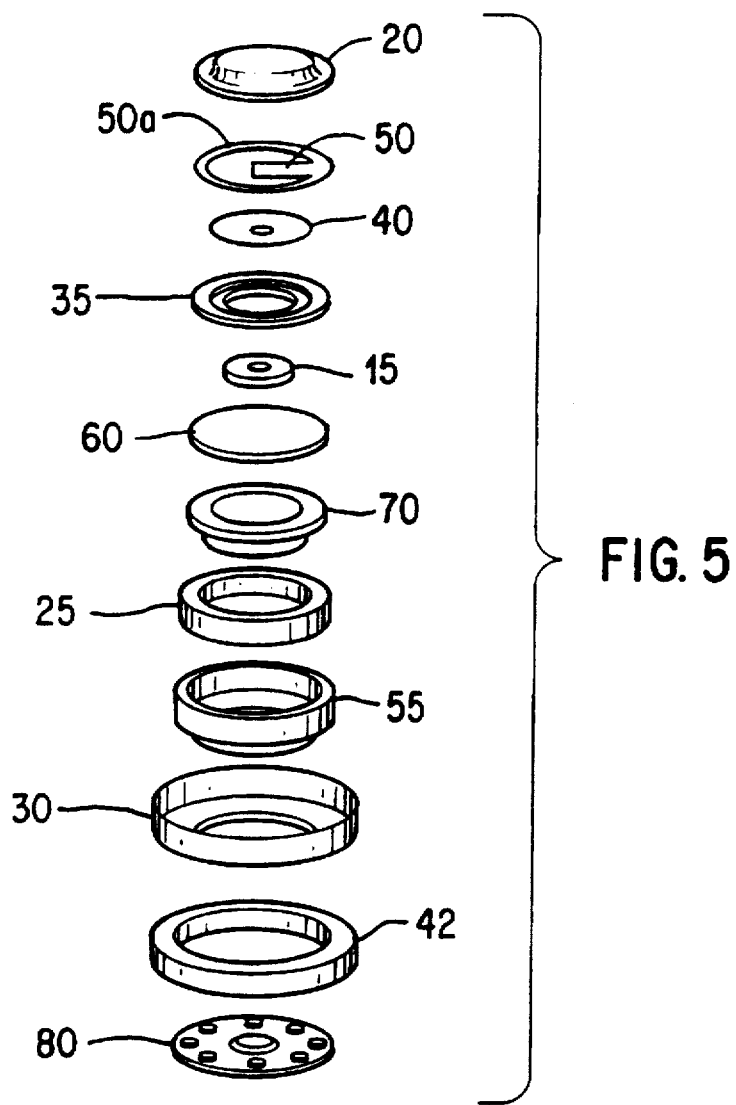

FIG. 5 is an exploded perspective view of the components of end cap assembly of the invention shown in the embodiment of FIG. 1.

Figure 6:
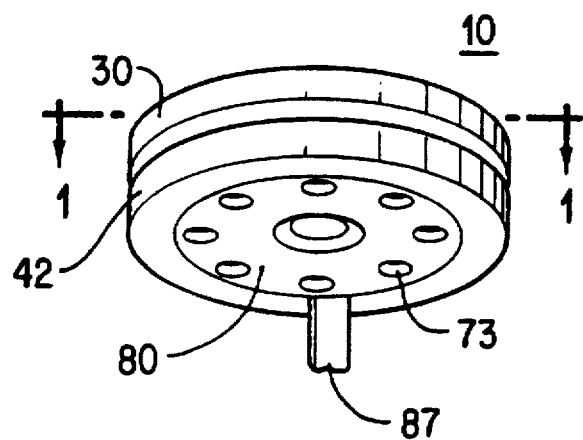

FIG. 6 is a perspective view of the bottom of the end cap assembly showing the pressure resistant plate and vent apertures therethrough.

Figure 7:
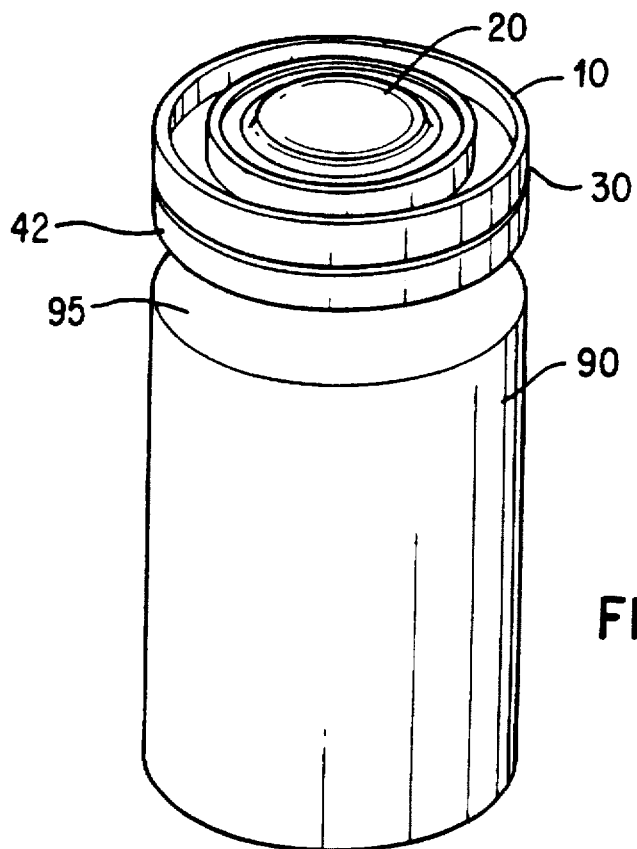

FIG. 7 is a perspective view showing the end cap assembly of the invention being inserted into the open end of a cylindrical casing of a cell.

Figure 8:
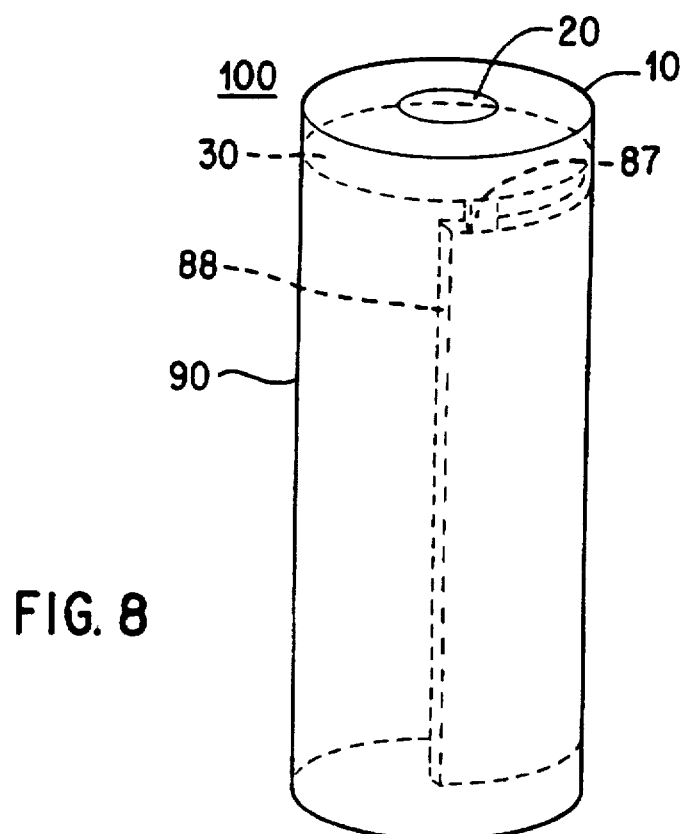

FIG. 8 is a perspective view showing a completed cell with the end cap assembly of the invention inserted into the open end of a cylindrical casing of a cell with end cap plate of said assembly forming a terminal of the cell.

DETAILED DESCRIPTION

The end cap assembly 10 (FIG. 1) of the invention may be applied to primary or secondary (rechargeable) cells. In a preferred embodiment the end cap assembly 10 is insertable into the open end 95 of a typically cylindrical casing 90 for the cell (FIG. 7). The cells contain a positive electrode (cathode on discharge), a negative electrode (anode on discharge), separator and electrolyte and positive and negative external terminals in electrical communication with the positive and negative electrodes, respectively.

Referring now to FIG. 1 of the drawings, an end cap assembly 10 intended for insertion into the open end of a cell case comprises a thermally activatable current interrupter subassembly 38 and a pressure relief subassembly 48 integrated therein. Subassemblies 38 and 48 are separated by a common support plate 60. Subassemblies 38 and 48 are held within a cover 30 which defines the outer wall of the end cap assembly 10. Interrupter subassembly 38 is defined at its top end by a cup-shaped end cap plate 20 and at its bottom end by a contact plate 15 which is welded to support plate 60. Cup shaped end cap plate 20 forms one of the external terminals of the cell. Support plate 60 separates chamber 68 within thermal subassembly 38 from chamber 78 within pressure relief subassembly 48. Contact plate 15 is electrically connected to support plate 60 which in turn is electrically connected to an electrode 88 (anode or cathode) of the cell when end cap assembly 10 is applied to a cell. A thermally responsive circuit interrupter mechanism (40,50) is provided to complete the circuit between contact plate 15 and end cap 20. If temperature within the cell exceeds a predetermined threshold value the interrupter mechanism activates breaking electrical contact between end cap 20 and contact plate 15 thereby preventing current from flowing through the cell.

The pressure relief subassembly 48 comprises a thin metallic diaphragm 70 connected to a pressure resistant plate 80 which in turn is electrically connected to a cell electrode 88 through conductive tab 87 which is welded to plate 80.

4

(Pressure resistant plate is electrically conductive and of sufficient thickness that it does not substantially deform at elevated pressures at least up to about 600 psi (4.14×10$^6$ pascal.) If gas pressure within the cell builds up to exceed a predetermined threshold value diaphragm 70 bulges outwardly to break electrical contact with pressure resistant plate 80 thereby preventing current from flowing to or from the cell. Pressure resistant plate 80 and support plate 60 preferably also have perforations. 73 and 63. respectively, therein which helps to vent gas and relieve pressure buildup within the cell.

In the preferred embodiment shown in FIG. 1 end cap assembly 10 may be used in a rechargeable cell, for example, a lithium-ion rechargeable cell. (A lithium-ion rechargeable cell is characterized by the transfer of lithium ions from the negative electrode to the positive electrode upon cell discharge and from the positive electrode to the negative electrode upon cell charging. It may typically have a positive electrode of lithium cobalt oxide ($Li_xCoO_2$) or lithium manganese oxide of spinel crystalline structure ($Li_xMn_2O_4$) and a carbon negative electrode. The negative electrode constitutes the anode of the cell during discharge and the cathode during charging and the positive electrode constitutes the cathode of the cell during discharge and the anode during charging. The electrolyte for such cells may comprise a lithium salt dissolved in a mixture of non-aqueous solvents. The salt may be $LiPF_6$ and the solvents may advantageously include dimethyl carbonate (DMC), ethylene carbonate (EC), propylene carbonate (PC) and mixtures thereof. The present invention is applicable as well to other rechargeable cells, for example, nickel metal hydride cells and nickel cadmium cells. End cap assembly 10 comprises an end cap terminal 20 which is typically the positive terminal of the rechargeable cell, a metal support plate 60 which forms a support base under the cap plate 20, and an insulator disk 35 between end cap 20 and support plate 60. Cap assembly 10 is advantageously also provided with a pressure relief diaphragm 70 below support plate 60 as shown in FIG. 1. Diaphragm 70 may be welded to an underlying pressure resistant plate 80. This may be conveniently done by welding the base 72 of diaphragm 70 to a raised portion 82 of underlying pressure resistant plate 80. Diaphragm 70 should be of material that is electrically conductive and of minimal thickness of between about 0.1 and 0.5 millimeter, depending on the pressure at which the diaphragm is intended to actuate. The diaphragm 70 may desirably be of aluminum. The diaphragm 70 is advantageously coined so that it ruptures at a predetermined pressure. That is, the diaphragm surface may be stamped or etched so that a portion of the surface is of smaller thickness than the remainder. One preferred diaphragm 70 for use in the present invention is coined to impose a semicircular or "C" shaped groove 70a in its surface. The shape of the groove advantageously is the same or similar to the shape of a major portion of the peripheral edge of diaphragm 70 and positioned advantageously in proximity to the peripheral edge. The particular pressure at which venting takes place is controllable-by varying parameters such as the depth, location or shape of the groove as well as hardness of the material. When pressure becomes excessive the diaphragm will rupture along the groove line. End cap 20 and support plate 60 define a chamber 68 therebetween in which is situated a thermally activated current interrupter subassembly 38. Insulator disk 35 is formed of a peripheral base portion 35a and a downwardly sloping arm 35b extending therefrom. Arm 35b extends into chamber 68. Diaphragm 70 is designed to rupture when gas buildup within the cell reaches a predetermined threshold level. The region between support plate 60 and diaphragm 70 forms a chamber 78 into which gas buildup within the cell may vent upon rupture of diaphragm 70.

Current interrupter subassembly 38 comprises a thermally responsive bimetallic disk 40, a metallic contact plate 15 in electrical contact with a resilient springlike member 50. As shown in FIGS. 1 and 5 resilient member 50 may be formed of a single flexible member having an outer circular peripheral portion 50a from which a disk retainer tab portion 50c extends radially inward to generally hold bimetallic disk 40 freely in place during any orientation of the cell while not restricting its snap acting movement. This member can be welded at one point of outer portion 50a to end cap plate 20 with a center contact portion 50b in contact with plate 15. Additionally, contact portion 50b can be designed with a reduced cross sectional area so that it can act as a disintegratable fuse link to protect against power surge conditions. Bimetallic disk 40 is positioned to freely engage sloping arms 35b of insulator disk 35 which arms act as the disk seat for disk 40. Bimetallic disk 40 also preferably includes a central aperture for receiveing a raised contacting portion of metallic contact plate 15. Contact plate 15 is preferably welded to support plate 60 and provides a surface for resilient member 50 to rest as shown in FIG. 1. There is an electrically insulating grommet 25 which extends over the peripheral edge of end cap 20 and along the bottom peripheral edge of diaphragm 70. Grommet 25 also abuts the outer edge of subassembly 38 as shown in FIG. 1. There may be a ring of metal 55 which is crimped over the top edge of grommet 25 and pressed against diaphragm 70 to seal the end cap assembly interior components. The grommet 25 serves to electrically insulate the end cap 20 from the crimp ring 55 and also to form a seal between support plate 60 and crimp ring 55. The cover 30 of the end cap assembly 10 may be formed from truncated cylindrical member shown best in FIG. 5. In a completed cell assembly (FIG. 8) the outside surface of cover 30 will come into contact with the inside surface of cell casing 90. Support plate 60 provides a base for components of subassembly 38 to rest and preferably is of bow shape to maintain active radial compressive force against the inside surface of grommet 25. Support plate 60 may be provided with perforations 63 in its surface to vent gas to upper chamber 68 when diaphragm 70 ruptures. Gas which passes into upper chamber 68 will vent to the external environment through primary vent holes 67 in end cap 20. The end cap assembly cover 30 is in contact with the cell casing 90 which is in electrical contact with the opposite terminal, typically the negative terminal in the case of a lithium-ion rechargeable cell. Thus, grommet 25 provides electrical insulation between end cap 20 and outer wall 30, that is, between the two terminals of the cell thereby preventing shorting of the cell. There may be an additional insulator ring, namely insulator standoff ring 42 between the top portion of outer wall 30 and pressure plate 80 as illustrated in FIG. 1, also to assure that there is no shorting between the positive and negative terminals of the cell.

Diaphragm 70 is preferably in the shape of a cup comprised of aluminum having a thickness advantageously of between about 3 and 10 mils. At such thickness the weld between diaphragm base 72 and support plate 80 breaks and the diaphragm base 72 bulges and separates from support plate 80 (FIG. 3) when internal gas pressure within the cell rises to a threshold value of at least between about 100 psi and 200 psi ($6.894\times10^5$ and $13.89\times10^5$ pascal). (Such pressure buildup could occur for example if the cell were being charged at higher than recommended voltage or if the cell were shorted or misused.) However, if desired the thickness of diaphragm base 72 can be conveniently adjusted to bulge at other pressure levels. The separation of diaphragm base 72 from plate 80 breaks all electrical contact between the diaphragm 70 and plate 80. This separation also breaks the electrical pathway between end cap 20 and the cell electrode 88 in contact with plate 80 so that current can no longer flow to or from the cell, in effect shutting down the cell. Even after the current path is broken if the pressure within the cell continues to rise for other reasons, for example, heating in an oven, the vent diaphragm 70 will also rupture preferably at a threshold pressure of at least between about 250 and 400 psi ($17.2\times10^5$ and $27.6\times10^5$ pascal) to prevent cell explosion. In such extreme circumstances the rupture of vent diaphragm 70 allows gas from the cell interior to vent through vent holes 73 (FIGS. 1 and 6) in pressure resistant plate 80 whereupon the gas enters lower chamber 78 (FIG. 1). The gas will then pass from lower chamber 78 to upper chamber 68 through vent holes 63 in the support plate 60 (FIG. 1) and if needed vent holes (not shown) in insulator disk 35. Gas collected in the upper chamber 68 will vent to the external environment through primary vent holes 67 in the end cap plate 20.

The current interrupt features of the invention may be described with reference to FIGS. 1–3. It should be noted that in the specific embodiment shown therein one of the cell electrodes comes into contact with plate 80 through tab 87 when the end cap assembly 10 is applied to a cell. During normal cell operation plate 80 in turn is electrically connected to end cap plate 20. In a lithium-ion cell the electrode 88 in contact with plate 80 may conveniently be the positive electrode. This electrode will be insulated from the cell casing 90. The negative electrode (not shown) will be connected to the cell casing 90. The embodiment of FIG. 1 shows the end cap assembly configuration before current is interrupted by either activation of the thermal current interrupter bimetallic disk 40 or activation of pressure relief diaphragm 70. In the specific embodiment illustrated in FIG. 1 plate 80 is in electrical contact with diaphragm 70 and diaphragm 70 is in electrical contact with support plate 60. Support plate 60 is in electrical contact with contact plate 15 which is in electrical contact with resilient member 50 which in turn is in electrical contact with end cap 20. In the integrated end cap design of the invention shown in FIG. 1, electrical contact between the electrode 88 in contact with pressure plate 80 and end cap 20 may be interrupted in two ways. As above described if pressure builds up in the cell to a predetermined threshold, contact between diaphragm 70 and pressure plate 80 is broken as diaphragm base 72 bulges away from pressure plate 80. This interruption in the circuit prevents current from flowing to or from the cell. Alternatively, if the cell overheats the bimetallic disk 40 of thermal interrupt subassembly 38 activates and in so doing pushes upwardly from insulator 35b thereby causing resilient member 50 to disengage from contact plate 15. This in effect severs the electrical path between electrode tab 87 and end cap 20, thus preventing current from flowing to or from the cell. It is an advantage of the invention to incorporate these two interrupt mechanisms within a single end cap assembly 10 which is insertable into the open end of a cell case as a single unit.

The bimetallic disk 40 is preferably not physically attached to underlying insulator disk 35 but rather is free to move, that is it rests in free floating condition on disk arm 35b as shown in FIG. 1. In such design current does not pass through the bimetallic disk 40 at any time regardless of whether the cell is charging or discharging. This is because disk 40 when inactivated is not in electrical contact with contact plate 15. However, should the cell overheat beyond a predetermined threshold temperature, bimetallic disk 40 is designed to the appropriate calibration such that it snaps or deforms (FIG. 2) causing it to push resilient member 50 away from contact plate 15 thereby preventing current from flowing between the cell terminals. The bimetallic disk 40 is calibrated so that it has a predetermined dished shape which allows the disk to actuate when a given threshold temperature is reached. The free floating design of bimetallic disk 40 on insulator disk arm 35b as above described does not permit current to pass therethrough at any time regardless of whether the cell is charging or discharging. This makes the calibration of disk 40 easier and more accurate, since there is no heating effect caused by current flow through bimetallic disk 40 ($I^2R$ heating). Bimetallic disk 40 may conveniently comprise two layers of dissimilar metals having different coefficient of thermal expansion. The top layer of bimetallic disk 40 (the layer closest to end cap 20) may be composed of a high thermal expansion metal, preferably nickel-chromium-iron alloy and the underlying or bottom layer may be composed of a low thermal expansion metal, preferably nickel-iron alloy. In such embodiment disk 40 may activate when temperature rises to at least between about 60° to 750° C. causing disk 40 to deform sufficiently to push resilient member 50 away from contact with contact plate 15. It is also possible to choose the high and low thermal expansion metal layers such that the disk 40 will not reset except at a temperature below −200° C. which in most applications makes the device a single action thermostatic device.

Preferred materials for the above described components are described as follows: End cap 20 is preferably of stainless steel or nickel plated steel of between about 8 to 15 mil (0.2 and 0.375 mm) thickness to provide adequate support, strength and corrosion resistance. The outer wall 30 of the end cap assembly 10 is also preferably of stainless steel or nickel plated steel having a thickness of between about 8 and 15 mil (0.2 and 0.375 mm. Pressure plate 80 is preferably of aluminum having a thickness between about 10 and 20 mils (0.25 and 0.5 mm) which may be reduced at the center to between about 2 and 5 mils (0.05 and 0.125 mm) at the point of welded contact with diaphragm base 72. Insulator standoff ring 42 may be composed of a high temperature thermoplastic material such as high temperature polyester for strength and durability available under the trade designation VALOX from General Electric Plastics Company. Crimp ring 55 is preferably of stainless steel or nickel plated steel having a thickness between about 8 and 15 mils (0.2 and 0.375 mm) for strength and corrosion resistance. Diaphragm 70 is preferably of aluminum having a thickness of between about 3 and 10 mils (0.075 and 0.25 mm). At such thickness the diaphragm will break away from its weld to pressure plate 80 when the internal gas pressure exceeds a threshold pressure between about 100 and 250 psi ($6.89 \times 10^5$ and $17.2 \times 10^5$ pascal). Should the internal gas pressure exceed a pressure between about 250 and 400 psi ($17.2 \times 10^5$ and $27.6 \times 10^5$ pascal) diaphragm 70 will rupture to provide additional relief from gas pressure buildup. The insulator disk 35 on which bimetallic disk 40 rests is preferably of a material of high compressive strength and high thermal stability and low mold shrinkage. A suitable material for disk 35 is a liquid crystal polymer or the like of thickness between about 10 and 30 mils (0.25 and 0.75 mm) available under the trade designation VECTRA from the Celanese Co. Support plate 60 is preferably of stainless steel or nickel plated steel to provide adequate strength and corrosion resistance at a thickness of between about 10 and 30 mils (0.25 and 0.75 mm). Resilient member 50 is advantageously formed of berylium-copper, nickel-copper alloy, stainless steel or the like which has good spring action and excellent electrical conductivity. A suitable thickness for resilient member 50 when formed of beryllium-copper or nickel-copper alloy is between about 3 and 8 mils (0.075 and 0.2 mm) to give sufficient strength and current carrying capability. This material may be plated or inlayed with silver or gold at the contact region to provide lower electrical resistance in this area. Contact plate 15 is advantageously formed of cold rolled steel plated with a precious metal such as gold or silver to lower contact resistance and improve reliability. It may also be formed of a nickel-copper clad alloy, stainless steel, or nickel-plated steel. Grommet 25 typically is made of polymeric materical such as nylon or polypropylene. The seal around the end cap assembly components should be hermetic in order that electrolyte, both in the form of liquid and vapor, is prevented from entering into the end cap chambers or from leaving the cell.

After the end cap assembly 10 is completed it may be inserted into the open end 95 of a cylindrical cell case 90 shown in FIG. 7. The circumferential edge of cell casing 90 at the open end thereof is welded to the outer wall of cover 30 of end cap assembly 10 to provide a hermetically tight seal between end cap assembly 10 and the cell casing 90. The radial pressure of the circumferential wall of crimp ring 55 against grommet 25 and diaphragm 70 produces a hermetically tight seal around the interior components of end cap assembly 10.

An alternative embodiment of the end cap design having both a pressure relief mechanism and thermally activated current interrupt mechanism integrated therein is shown as end cap assembly 110 in FIG. 4. The embodiment of FIG. 4 is similar to that described above with respect to FIGS. 1–3 except that a bimetallic disk is not employed to activate the springlike mechanism. Instead a thermal pellet 175 is provided to hold a resilient springlike member 150 in electrical contact with contact plate 115. Contact plate 115 in turn is in electrical contact with end cap plate 20. Resilient member 150 may comprise an elongated metallic arm 150a which is welded at one end to support plate 60. Support plate 60 is in electrical contact with diaphragm 70 which in turn is welded to a raised portion 82 of underlying pressure resistant plate 80. An electrode tab 87 is in electrical contact with plate 80. Resilient member 150 preferably terminates at its opposite end in a cup or convex shaped portion 150b which contacts contact plate 115. There is an electrical insulator disk 120 over the peripheral edge 60a of support plate 60 to prevent direct contact between support plate 60 and contact plate 115. Thus, there will be electrical contact between support plate 60 and end cap 20 as long as resilient member 150 is held pressed against contact plate 115. Support plate 60 in turn is in electrical contact with aluminum diaphragm 70 which is in contact with plate 80 and a cell electrode 88 through tab 87 when the end cap assembly 110 is applied to a cell. (End cap assembly 110 may be applied to a cell by inserting it into the open end of a cylindrical casing 90 in the same manner as above described with reference to the embodiment shown in FIG. 1.) Therefore, as resilient member 150 is held pressed against contact plate 115 by thermal pellet 175, there is electrical contact between a cell electrode 88 (through tab 87) and end cap plate 20 permitting normal cell operation. If the cell overheats beyond a predetermined threshold temperature pellet 175 melts thereby removing support for resilient member 150. Melting of pellet 175 causes resilient member 150 to snap downwardly and break electrical contact with contact plate 115. This in effect severs the electrical pathway between the electrode tab 87 and end cap 20 thus preventing current from flowing to or from the cell. If the internal gas pressure within the cell exceeds a predetermined value diaphragm 70 will rupture thereby severing electrical contact between plate 80 and diaphragm 70 and also allows gas to escape to the external environment through vent holes 63 and 67 in support plate 60 and end cap 20, respectively.

Preferred materials for the end cap 20, support plate 60, contact plate 115 and aluminum diaphragm 70 reference in the embodiment shown in FIG. 4 may be the same as described for the corresponding elements having the same reference numerals shown in FIGS. 1–3. Contact plate 115 is preferably formed of stainless steel or nickel plated cold rolled steel plated with silver or gold to lower its contact resistance. The insulator disk 120 shown in FIG. 4 is preferably made of a high temperature thermoplastic material having excellent dielectric properties. A preferred material for disk 120 may a polyimide available under the trade designation KAPTON from E. I. DuPont Co. or high temperature polyester available under the trade designation VALOX from General Electric Plastics Co. Resilient member 150 may advantageously be formed of beryllium-copper alloy of thickness between about 5 and 10 mils (0.125 and 0.25 mm) to provide good conductivity when in contact with plate 115 and reliable spring action when the pressure of pellet 175 against it is removed. Additionally, the resilient arm 150 may be plated with silver or gold to increase its conductivity. The thermal pellet 175 is advantageously formed of a polymer having a relatively low melting point, e.g., between about 65° C. and 100° C. but yet excellent compressive strength to keep the resilient arm 150 in place during normal cell operation. A suitable material for thermal pellet 175 having such properties is a polyethylene wax available under the trade designation POLYWAX from Petrolyte Co. A thermal pellet 175 of such polyethylene wax melts within a desirable temperature range of between about 75° C. and 80° C.

An exploded view of the end cap assembly 10 of FIG. 1 is shown in FIG. 5. The end cap assembly 10 may be made by assembling the components shown in FIG. 5 in the following order: A preassembly is formed comprising components 20, 50, 40, 35, 15, 60, 70, 25, and 55. This is conveniently accomplished by first inserting plastic grommet 25 into crimp ring 55, then inserting vent diaphragm 70 into grommet 25 and then inserting support plate 60 with contact plate 15 welded thereto into vent diaphragm 70. Thereupon insulator disc 35 is placed around contact plate 15 and bimetallic disk 40 is placed to rest on downwardly sloping arm 35b of insulator disk 35. Bimetallic disk 40 is not bonded to insulator disk 35 but rests thereon in a free floating condition, with the insulator disk helping to act as positioning means for the bimetallic disk. The top surface of the outer end of resilient springlike member 50 is welded to the circumferential edge of end cap 20. The end cap 20 with resilient member 50 welded thereto is then placed over insulator disk 35 so that the raised central portion of contact plate 15 contacts the interior end of resilient member 50 and the bottom surface of the outer end of resilient member 50 contacts the circumferential edge of insulator disk 35. Thus, the outer end of resilient member 50 is wedged between end cap 20 and insulator disk 35 and the opposite or inner end of member 50 is in contact with contact plate 15. Then, ring 55 is mechanically crimped over the top edge of grommet 25 to hold the top end of grommet 25 tightly pressed against the circumferential edge of end cap 20. This crimping is accomplished by applying mechanical force along the centroidal (vertical) axis of ring 55. Then in a second crimping step mechanical pressure is applied radially to the walls of crimp ring 55, thereby completing assembly of the preassembly. The radial crimping serves to keep the preassembly internal components tightly and hermetically sealed within the ring 55. The preassembly is then inserted into metallic cover 30 so that the bottom surface of crimp ring 55 rests against the bottom inside edge of cover 30. Thereupon the bottom surface of crimp ring 55 is welded to the bottom inside surface of cover 30. Pressure plate 80 is then snapped into the bottom of insulator standoff ring 42 and the standoff ring 42 with pressure plate 80 attached thereto is then placed against the outside bottom surface of cover 30 so that the raised central portion of pressure plate 80 contacts vent diaphragm 70. This point of contact between pressure plate 80 and diaphragm 70 is then spot welded thus completing construction of end cap assembly 10. The end cap assembly 10 may be applied to a cell, for example, by inserting it into the open end of the cylindrical casing 90 of a cell as shown in FIG. 7 and welding the outer surface of cover 30 to the inside surface of the cylindrical casing 90 at the open end 95 thereof. This results in cell 100 shown in FIG. 8 with end cap assembly 10 being tightly sealed within the cylindrical casing 90 and the end cap plate 20 forming a terminal of the cell.

While this invention has been described in terms of certain preferred embodiments, the invention is not to be limited to the specific embodiments but rather is defined by the claims and equivalents thereof.

What is claimed is:

1. An end cap assembly for application to an electrochemical cell having a positive and a negative terminal and a pair of internal electrodes (anode and cathode), said end cap assembly comprising a housing and an end cap plate, said plate functional as a cell terminal, said end cap assembly having an electrically conductive pathway therethrough permitting the end cap plate to be electrically connected to a cell electrode when said end cap assembly is applied to a cell, said end cap assembly further comprising a) thermally responsive means for preventing current from flowing through said electrical pathway, wherein said thermally responsive means is activatable when the temperature within said end cap assembly reaches a predetermined level causing a break in said electrical pathway and b) pressure responsive means for preventing current from flowing through said electrical pathway, wherein said pressure responsive means is activatable when gas pressure applied to at least a portion of said electrical pathway reaches a predetermined level causing a break therein.

2. The end cap assembly of claim 1 wherein said end cap assembly is applied to an electrochemical cell by inserting it into the open end of a casing of said cell and welding the end cap assembly to the casing.

3. The end cap assembly of claim 1 wherein said thermally responsive means comprises a bimetallic member and a resilient electrically conductive member, the resilient member forming a portion of said electrical pathway, wherein when the temperature within said assembly reaches a predetermined level the bimetallic member deforms thereby pushing against said resilient metallic member causing a break in said electrical pathway.

4. The end cap assembly of claim 3 wherein the conductive member has a portion of reduced cross sectional area to act as a disintegrable fuse link to protect against power surge conditions.

5. The end cap assembly of claim 3 wherein the bimetallic member is movably positioned to engage a disk seat on a surface of an electrically insulating member within said end cap assembly.

6. The end cap assembly of claim 5 wherein a portion of said resilient conductive member is sandwiched between a portion of said end cap plate and a portion of said electrically insulating member.

7. The end cap assembly of claim 3 wherein said resilient conductive member includes a retainer means for limiting movement of said bimetallic member while not restricting its deforming action when the temperature within said assembly reaches a predetermined level.

8. The end cap assembly of claim 3 wherein said pressure responsive means comprises a diaphragm plate adapted to be electrically connected to a cell electrode when said end cap assembly is applied to an electrochemical cell, wherein said diaphragm plate deforms to cause a break in said electrical pathway thereby severing electrical connection between said end cap plate and said electrode when said end cap assembly is applied to a cell and the cell internal gas pressure reaches a first predetermined level.

9. The end cap assembly of claim 8 further comprising a support plate placed across the interior width of the end cap assembly, said support plate dividing the interior of the end cap assembly into an upper chamber and a lower chamber, the upper chamber being closer to the end cap plate than the lower chamber.

10. The end cap assembly of claim 9 further comprising an electrically conductive pressure resistant plate located at the end of the end cap assembly opposite said end cap plate, wherein said diaphragm plate is welded to the electrically conductive pressure resistant plate, said pressure resistant plate having at least one aperture therethrough, wherein a portion of said pressure resistant plate and a portion of said diaphragm forms at least part of said electrically conductive pathway.

11. The end cap assembly of claim 10 wherein said diaphragm plate ruptures when said end cap assembly is applied to a cell and gas pressure within the cell reaches a second predetermined level greater than said first predetermined level, whereupon gas from the interior of the cell passes through said ruptured diaphragm plate and into said lower chamber.

12. The end cap assembly of claim 10 wherein said diaphragm plate has a grooved path therein of reduced thickness.

13. The end cap assembly of claim 12 wherein said grooved path conforms generally to a major portion of the outer peripheral shape of the diaphragm plate wherein said grooved path provides a rupture path for said diaphragm.

14. The end cap assembly of claim 13 wherein said grooved path is of substantially "C" shape.

15. The end cap assembly of claim 11 wherein the support plate has at least one aperture therethrough so that gas from the interior of the cell which accumulates in the lower chamber may pass through said support plate aperture and into the upper chamber.

16. The end cap assembly of claim 15 wherein the end cap plate has at least one aperture therethrough so that gas which passes into said upper chamber may pass through said end cap aperture to the external environment.

17. The end cap assembly of claim 9 further comprising an electrically conductive contact plate welded to a surface of said support plate, wherein a portion of said resilient conductive member contacts said contact plate and wherein at least a portion of said contact plate and said resilient conductive member form a part of said electrically conductive pathway.

18. The end cap assembly of claim 9 wherein the peripheral edge of said support plate contacts the peripheral edge of said diaphragm plate and the diaphragm plate is electrically connectable to a cell electrode when the end cap assembly is applied to a cell.

19. The end cap assembly of claim 17 wherein when said bimetallic member reaches a predetermined temperature it deforms causing the resilient conductive member to sever its electrical connection with said contact plate.

20. The end cap assembly of claim 11 further comprising an electrically insulating grommet in contact with the peripheral edge of the end cap plate and the peripheral edge of the diaphragm plate, said end cap assembly further comprising a metallic crimping member mechanically crimped around said grommet to hold said diaphragm plate and said support plate under mechanical compression.

21. The end cap assembly of claim 20 further comprising a metallic cover contacting a portion of said crimping member and protecting the outside surface of said crimping member.

22. The end cap assembly of claim 17 wherein the end cap assembly is applied to a cell by inserting it into the open end of a cylindrical casing for the cell and welding the outside surface of said cover to the inside surface of said casing, whereupon the end cap assembly becomes tightly sealed within the cylindrical case with the end cap plate comprising a terminal of the cell being exposed to the external environment.

23. The end cap assembly of claim 1 wherein the thermally responsive means comprises a resilient conductive member in electrical contact with said end cap plate, and a meltable mass of material holding said resilient conductive member in electrical connection between said end cap plate and another conductive portion of the end cap assembly, said other conductive portion adapted to be electrically connected to a cell electrode when the end-cap assembly is applied to a cell thereby providing an electrical connection between said end cap plate and said electrode during cell operation, wherein when the cell temperature reaches a predetermined level said mass of material melts thereby causing movement in said resilient metallic member to sever the electrical connection between said end cap plate and said cell electrode thereby preventing operation of the cell.

24. In an electrochemical cell of the type formed by an end cap assembly inserted into an open ended cylindrical case for the cell, said cell further having a positive and a negative terminal and a pair of internal electrodes (anode and cathode), wherein said end cap assembly has a housing and an exposed end cap plate, said end cap plate functional as a cell terminal, the improvement comprising said end cap plate being electrically connected to one of said electrodes through an electrically conductive pathway within said end cap assembly, said end cap assembly further comprising a) thermally responsive means for preventing current from flowing through the cell, wherein said thermally responsive means is activatable when the temperature within the cell reaches a predetermined level causing a break in said electrical pathway between said end cap plate and said electrode thereby preventing current from flowing through the cell and b) pressure responsive means for causing a break in said electrical pathway between said end cap plate and said electrode when the internal gas pressure within the cell reaches a predetermined level thereby preventing current from-flowing through the cell.

25. The electrochemical cell of claim 24 wherein said thermally responsive means for preventing current flow through the cell comprises a bimetallic member and a resilient electrically conductive member, the resilient member being in electrical contact with said end cap plate and a cell electrode, thereby providing an electrical pathway therebetween, wherein when the cell temperature reaches a predetermined level the bimetallic member deforms and pushes against said resilient member causing said resilient member to sever said electrical pathway between the end cap plate and said cell electrode thereby preventing operation of the cell.

26. The electrochemical cell of claim 25 wherein the bimetallic member is movably positioned to engage a disk seat on a surface of an electrically insulating member within said end cap assembly.

27. The end cap assembly of claim 25 wherein the resilient conductive member has a portion of reduced cross sectional area to act as a disintegrable fuse link to protect against power surge conditions.

28. The electrochemical cell of claim 26 wherein a portion of said resilient conductive member is sandwiched between a portion of said end cap plate and a portion of said electrically insulating member.

29. The electrochemical cell of claim 24 wherein said pressure responsive means comprises a diaphragm plate adapted to be placed in electrical contact with a cell electrode when said end cap assembly is applied to an electrochemical cell, wherein said diaphragm plate deforms to cause a break in said electrical pathway thereby severing electrical connection between said end cap plate and said electrode when the cell internal gas pressure reaches a first predetermined level.

30. The electrochemical cell of claim 29 further comprising a support plate placed across the interior width of the end cap assembly, said support plate dividing the interior of the end cap assembly into an upper chamber and a lower chamber, the upper chamber being closer to the end cap plate than the lower chamber.

31. The electrochemical cell of claim 30 further comprising an electrically conductive pressure resistant plate located at the end of the end cap assembly opposite said end cap plate, wherein said diaphragm plate is welded t o an electrically conductive pressure resistant plate, said pressure resistant plate having a t least one aperture therethrough, wherein at least a portion of said pressure resistant plate and said diaphragm plate forms a part of said electrical pathway.

32. The electrochemical cell of claim 31 wherein said diaphragm plate ruptures when said end cap assembly is applied to a cell and gas pressure within the cell reaches a second predetermined level greater than said first predetermined level whereupon gas from the interior of the cell passes through said ruptured diaphragm plate and into said lower chamber.

33. The end cap assembly of claim 31 wherein said diaphragm plate has a grooved path therein of reduced thickness.

34. The end cap assembly of claim 33 wherein said grooved path conforms generally to a major portion of the outer peripheral shape of the diaphragm plate wherein said grooved path provides a rupture path for said diaphragm.

35. The end cap assembly of claim 34 wherein said grooved path is of substantially "C" shape.

36. The electrochemical cell of claim 32 wherein the support plate has at least one aperture therethrough so that gas from the interior of the cell which accumulates in the lower chamber may pass through said support plate aperture and into the upper chamber.

37. The electrochemical cell of claim 36 wherein the end cap plate has at least one aperture therethrough so that gas which passes into said upper chamber may pass through said end cap aperture to the external environment.

38. The electrochemical cell of claim 30 further comprising an electrically conductive contact plate welded to a surface of said support plate, wherein a portion of said resilient member contacts said contact plate and said support plate is electrically connectable to an electrode of the cell when the end cap assembly is applied to a cell.

39. The electrochemical cell of claim 30 wherein the peripheral edge of said support plate contacts the peripheral edge of said diaphragm plate and the diaphragm plate is electrically connectable to a cell electrode when the end cap assembly is applied to a cell.

40. The electrochemical cell of claim 38 wherein when the cell temperature reaches a predetermined temperature said bimetallic member deforms causing the metallic resilient member to sever its electrical connection with said contact plate.

41. The electrochemical cell of claim 37 further comprising an electrically insulating grommet in contact with the peripheral edge of the end cap plate and the peripheral edge of the diaphragm plate, said end cap assembly further comprising a metallic crimping member mechanically crimped around said grommet to hold said diaphragm plate and said support plate under mechanical compression.

42. The electrochemical cell of claim 41 further comprising a metallic cover contacting a portion of said crimping member and protecting the outside surface of said crimping member.

43. The electrochemical cell of claim 42 wherein the end cap assembly is applied to a cell by inserting it into the open end of a cylindrical casing for the cell and welding the outside surface of said cover to the inside surface of said casing, whereupon the end cap assembly becomes tightly sealed within the cylindrical case with the end cap plate comprising a terminal of the cell being exposed to the external environment.

44. The electrochemical cell of claim 24 wherein the thermally responsive means comprises a resilient conductive member in electrical contact with said end cap plate, and a meltable mass of material holding said resilient member in electrical connection between said end cap plate and another conductive portion of the end cap assembly, said other conductive portion adapted to be electrically connected to a cell electrode when the end cap assembly is applied to a cell thereby providing an electrical connection between said end cap plate and said electrode during cell operation, wherein when the cell temperature reaches a predetermined level said mass of material melts thereby causing movement in said resilient member to sever the electrical connection between said end cap plate and said cell electrode thereby preventing operation of the cell.

45. A current interrupter for providing protection to a device being supplied with electrical current comprising a housing member having an electrically conductive pathway therethrough in electrical connection with said device, a thermally responsive means contained within said housing member for preventing current from flowing through said electrical pathway, wherein said thermally responsive means is activated when the temperature within said housing reaches a predetermined level causing a break in said electrical pathway, and a pressure responsive means contained within said housing separate from said thermally responsive means for preventing current from flowing through said electrical pathway, wherein said pressure responsive means is activated when fluid pressure reaches a predetermined level causing a break in said electrical pathway.

46. The current interrupter of claim 45 wherein said thermally responsive means comprises a bimetallic member and a resilient electrically conductive member, the resilient member forming a portion of said electrical pathway, wherein when said bimetallic member reaches a predetermined level, it snaps thereby causing said resilient member to move causing a break in said electrical pathway.

47. The current interrupter of claim 46 wherein said resilient electrically conductive member has a portion of reduced cross-sectional area to act as fuse link to protect against power surge conditions.

48. The current interrupter of claim 45 wherein said pressure responsive means comprises an electrically conductive diaphragm member adapted to be electrically connected to said electrical pathway wherein when said pressure on said diaphragm member reaches a first predetermined level said diaphragm member deforms to cause a break in said electrical pathway.

49. The current interrupter of claim 48 wherein said diaphragm member ruptures when said fluid pressure upon said diaphragm member reaches a second predetermined level higher than said first predetermined level thereby allowing fluid to pass through said diaphragm member.

50. The current interrupter of claim 49 wherein said diaphragm member has a grooved path of reduced material thickness therein, wherein said grooved path acts as the rupture point when the fluid pressure on said diaghragm member reaches said second predetermined level.

51. The current interrupter of claim 50 wherein said grooved path conforms generally to a major portion of the outer peripheral shape of the diaphragm element.

* * * * *